United States Patent [19]

Bremer

[11] Patent Number: 5,712,471
[45] Date of Patent: Jan. 27, 1998

[54] BAR CODE SCANNER HAVING A SPIRAL TORSION DEFLECTOR

[75] Inventor: Edward Bremer, Rochester, N.Y.

[73] Assignee: PCS Inc., Webster, N.Y.

[21] Appl. No.: 522,683

[22] Filed: Sep. 1, 1995

[51] Int. Cl.⁶ ................................................ G06K 07/10
[52] U.S. Cl. ........................................ 235/492; 235/462
[58] Field of Search ................................. 235/472, 462

[56] References Cited

U.S. PATENT DOCUMENTS

| | | | |
|---|---|---|---|
| 3,566,029 | 2/1971 | Lee | 178/7.6 |
| 3,621,939 | 11/1971 | Hughes | 185/39 |
| 3,820,432 | 6/1974 | Fishbein | 84/94 |
| 3,888,562 | 6/1975 | Rushing et al. | 350/7 |
| 3,891,299 | 6/1975 | Rushing | 350/6 |
| 4,237,549 | 12/1980 | Härle | 368/134 |
| 4,254,856 | 3/1981 | Komatsu et al. | 192/415 |
| 4,881,621 | 11/1989 | Ishida | 185/39 |
| 5,022,340 | 6/1991 | Caraba | 116/77 |
| 5,099,110 | 3/1992 | Shepard et al. | 235/472 |
| 5,206,492 | 4/1993 | Shepard et al. | 235/472 |
| 5,302,812 | 4/1994 | Li et al. | 235/462 |

Primary Examiner—Donald T. Hajec
Assistant Examiner—Douglas X. Rodriguez
Attorney, Agent, or Firm—Foley & Lardner

[57] ABSTRACT

A scanner for reading bar codes minimizes electrical power consumption and operator fatigue by using stored mechanical energy in a wound-up coil spring to impart oscillations in one of the scanner components.

21 Claims, 3 Drawing Sheets

BAR CODE SCANNER HAVING A SPIRAL TORSION DEFLECTOR

BACKGROUND OF THE INVENTION

1. Field of the Invention

This invention generally relates to a scanning device, more particularly a portable scanning device with low electrical power requirements.

2. Description of Related Art

Various scanners have been developed to optically read bar codes applied to objects in order to identify them. The bar code itself is a coded pattern comprised of a series of bars of various widths and spaced apart from one another to bound spaces of various widths, the bars and spaces having different light reflecting properties. The scanners electro-optically decode the coded patterns into representations descriptive of the objects.

The operation of a scanner is described as follows. The scanner emits a light beam, preferably a laser beam, from a light source, preferably a gas laser or a laser diode, and directs the laser beam to an optical code (e.g. a bar code) to be read. In the transmission path to the optical code, the laser beam is directed to, and reflected off, a light reflector of a scanning component. The scanning component moves the reflector in a cyclical fashion and causes the laser beam to repetitively scan across the optical code. The optical code reflects the laser beam incident thereon and a portion of the incident light reflected from the optical code is collected and detected by a detector component, e.g. a photodiode, of the scanner. The photodiode has a field of view, and the detected light over the field of view is converted by the photodiode into electrical signals which are provided to a decoder to convert the signals into data descriptive of the optical code which is then processed in accordance with a protocol for the optical code. One such protocol is the Universal Product Code (UPC). The cyclically movable reflector operates to sweep the laser beam across the optical code and/or to sweep the field of view during scanning.

In portable scanners, a power source such as batteries is self-contained in the scanning unit. The power source generally is required to drive the scanning components, to produce the laser and to process the reflected beam. By far, the most significant drain on the power source in such systems is associated with the driving of the scanning components. Several different methods of driving scanning components are disclosed in the prior art which use an electric motor to drive the scanning components. Such devices consume a large electrical current and reduce the working lifetime of the on-board power supply.

Shepard et al., U.S. Pat. No. 5,206,492, disclose a bar code scanner which does not use an electric motor to oscillate the scanning components. In the device, each end of a torsion wire is secured to a support and a movable scanning component is mounted on the torsion wire to oscillate thereon.

In one embodiment, the operator is required to tension the torsion wire to initiate the oscillations. The operator must squeeze the trigger hard enough to tension the torsion wire sufficiently to initiate the oscillations in the scanning component. A disadvantage of this embodiment is that the operator is susceptible to developing carpal tunnel syndrome from the repeated biomechanical stresses from squeezing the trigger with adequate force for every scan.

In another embodiment, a solenoid is used assist the operator in tensioning the torsion wire. Here, the trigger can be squeezed with minimal force. The trigger activates the solenoid which in turn tensions the torsion wire to initiate the oscillations of the component. The drawback of this embodiment is that the solenoid acts as an additional source of drain on the battery and compromises the power saving capability of the device.

SUMMARY OF THE INVENTION

1. Objects of the Invention

An objective of this invention is to minimize electrical power consumption of bar code scanners.

Another objective of this invention is to minimize electrical power consumption of bar code scanners while reducing the biomechanical stresses associated with trigger squeezing.

Another objective of this invention is to increase the working lifetime of batteries used in portable bar code scanners.

2. Features of the Invention

The above and other objects of the invention are accomplished with a bar code scanner for scanning indicia having parts of different light reflectivity by directing light toward the indicia and by collecting reflected light returning from the indicia. This bar code scanner comprises a movable component mounted in a transmission path for guiding light therein and a spring powered means for imparting oscillations to the component which guides the light in the transmission path. At least one of the oscillations of the component guides the light across all parts of a bar code to read the same.

The spring powered means preferably comprises a coil spring, an output shaft connected with the coil spring for rotation thereby when the coil spring is released, the output shaft including means for imparting oscillations in the component, a winding mechanism for winding up and retaining the coil spring, and a trigger for releasing the coil spring for a desired number of rotations of the output shaft.

Thus, in accordance with this invention, the oscillations in the scanner component is initiated with the help of mechanical power stored in a coil spring. As a result, the operator is not responsible for supplying all the force required to initiate the oscillations in the scanner component. According to the invention, the trigger merely releases the stored energy in the coil spring. In addition, this invention does not use a solenoid and consequently, electrical power consumption during scanning is further minimized and the working lifetime of on-board batteries further increased.

DETAILED DESCRIPTION OF THE PREFERRED EMBODIMENTS

Figure 1:
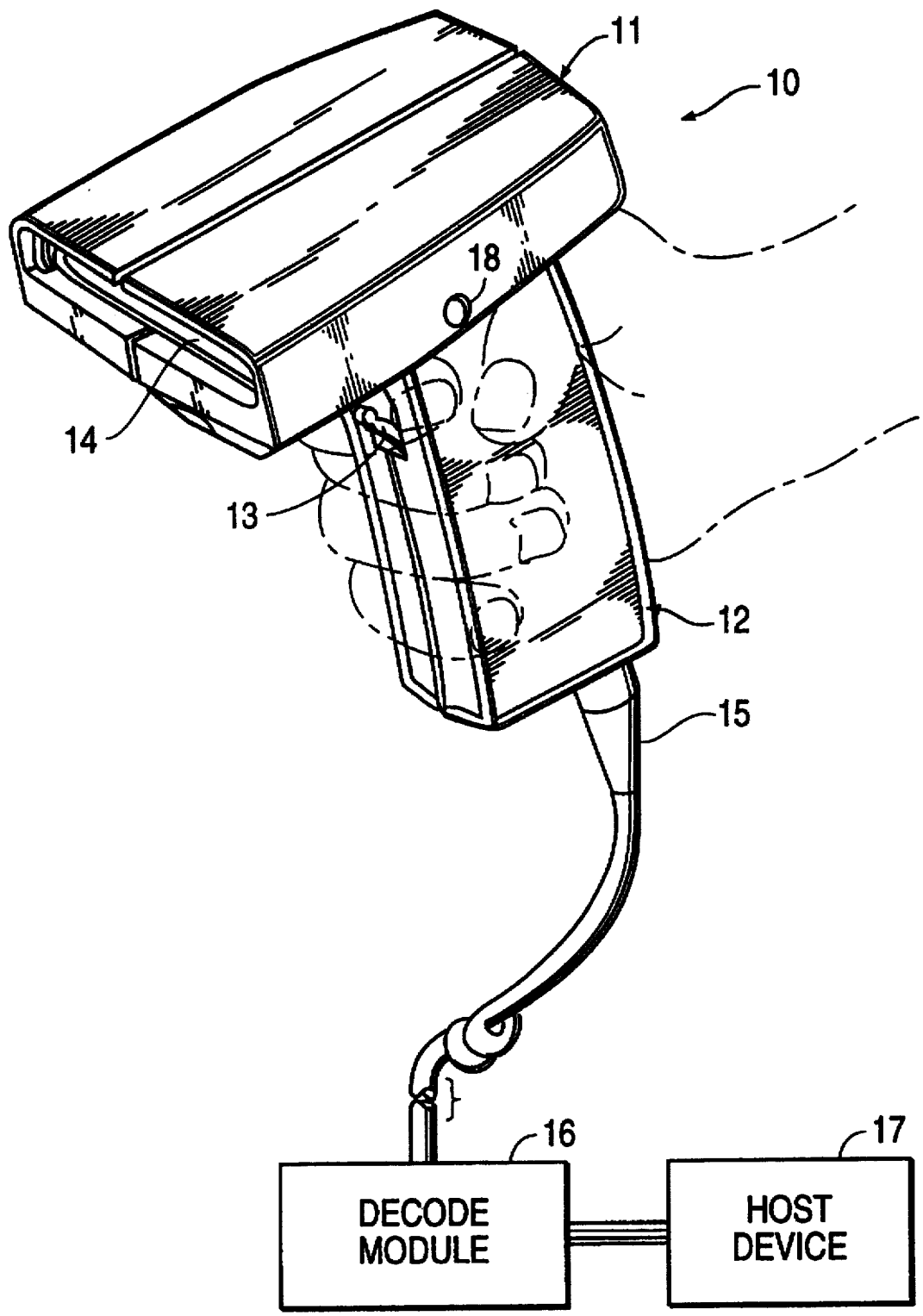
FIG. 1 is a front perspective view of a hand held scanner.

In FIG. 1, a hand-held, gun-shaped scanner 10 has a barrel 11 and a handle 12. A manually-operable trigger 13 is situated below the barrel 11 on an upper, forwardly-facing part of the handle 12. As known in the art, a light source component, typically a laser, is mounted inside the scanner 10. The light source emits a light beam along a transmission path which extends outwardly through a window 14 that faces optical indicia, e.g. bar codes, to be read. Also mounted within the head is a photodetector component, e.g. a photodiode, having a field of view, and operative for collecting reflected light returning through the window 14 along a return path from the indicia.

A scanner component is mounted within the scanner 10, and is operative for scanning the indicia with the laser and/or the field of view of the photodetector. The scanner component may include a light reflector positioned in the transmission path and/or the return path. The photodetector generates an electrical analog signal indicative of the variable intensity of the reflected light. This analog signal is converted into a digital signal by an analog-to-digital converter circuit. This digital signal is conducted, according to one embodiment, along an electrical cable 15 to a decode module 16 located exterior to the scanner 10. The decode module 16 decodes the digital signal into data descriptive of the optical code. An external host device 17, usually a computer, serves mainly as a data store in which the data generated by the decode module 16 is stored for subsequent processing.

In use, each time a user wishes to have an optical code read, the user aims the head at the optical code and pulls the trigger 13 to initiate reading of the optical code. The optical code is repetitively scanned a plurality of times per second, e.g. 30–55 times per second. As soon as the optical code has been successfully decoded and read, the scanning action is automatically terminated, thereby enabling the scanner to be directed to the next optical code to be read.

Figure 2A:
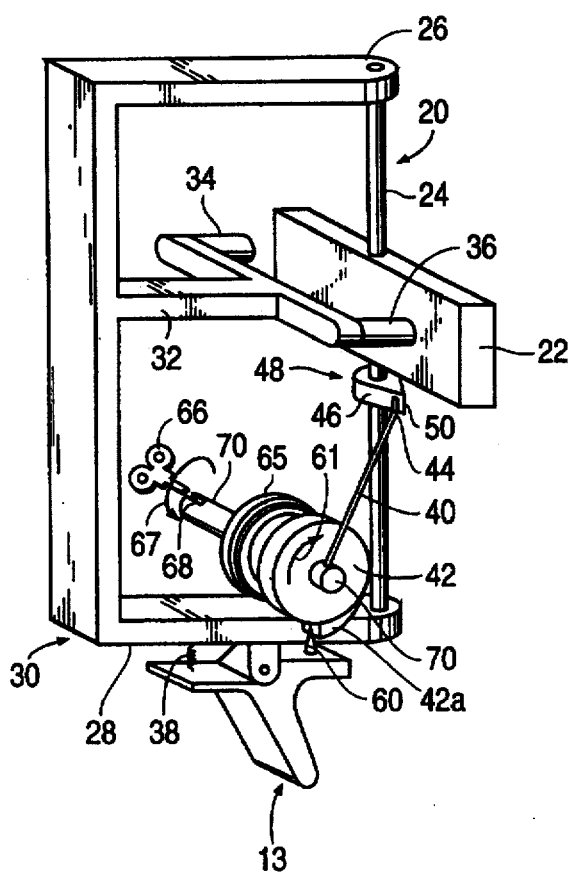
FIG. 2A is an enlarged front perspective view of a scanning arrangement for use in the scanner of FIG. 1 according to one embodiment of this invention.

In FIG. 2A, the trigger 13 is shown in connection with a power-saving scanning arrangement 20 according to one embodiment of this invention. The arrangement 20 includes a light reflector 22, preferably a planar mirror, fixedly mounted on a torsion wire 24. The torsion wire 24 has opposite ends pivotally secured to spaced-apart arms 26, 28 of a generally E-shaped support frame 30. The frame 30 has a middle arm 32 on which a pair of stops 34, 36 are transversely spaced apart of each other on opposite sides of the torsion wire 24.

The trigger 13 is pivotably mounted on the lower arm 28. An automatic return spring 38 is mounted between the lower arm 28 and the trigger 13, and is operative to constantly urge the trigger to the off state. A projection 60 of the trigger 13 engages a notch 42a of a rotary cam 42 and prevents rotation of the rotary cam 42 in the direction indicated by arrow 61 when the trigger 13 is in the off (forward) position.

A shaft 70 is rotatably mounted in the housing of the scanner and extends through the rotary cam 42 and a coil spring 65. The rotary cam 42 and the coil spring 65 are fixedly mounted on the shaft 70. The coil spring 65 urges the rotary cam 42 to rotate in the direction indicated by arrow 61. A wind key 66 is rotated in the direction indicated by arrow 67 for winding the coil spring 65. The wind key 66 is adapted to engage the shaft 70 from a position external to the housing of the scanner and is inserted through a hole provided in the housing into slot 68 of shaft 70. For example, the wind key 66 is inserted through hole 18 of the barrel 11 as shown in FIG. 1. Alternative means for winding a coil spring may also be provided, for example, winding cords used in toys and music boxes.

A wire 40 is connected to the shaft 70 and at its opposite end 44 engages a tapered surface 46 of a cam 48 that is fixedly mounted on the torsion wire 24. The cam 48 has a circular portion and an integral, generally triangular, portion which terminates radially in a tip 50. The cam 48 could also be mounted on the reflector 22.

As illustrated in FIG. 2A, the trigger is in an off state, and the reflector 22 is positioned in a so-called rest position. The reflector 22 is situated in the aforementioned transmission path of the light beam and/or the return path of the reflected light. The reflector 22 is spaced away from stops 34 and 36 in the rest position. In order to initiate scanning, i.e. reading of the optical code, the user displaces or pulls the trigger 13 against the restoring action of the automatic return spring 38. The rotary cam 42 is released and the stored energy in the coil spring 65 rotates the rotary cam 42 in the direction indicated by arrow 61. The wire 40 participates in this movement and, in turn, the end 44 firmly bears against and follows the tapered surface 46 in a radially outward direction. The cam 48 and the reflector 22 are jointly moved in one circumferential direction away from the rest position, thereby moving and twisting the torsion wire 24 about its longitudinal axis.

This movement and twisting continue until the reflector 22 strikes the stop 34, thereby preventing further movement of the reflector past the stop 34. The stop 34 defines a scan end position, also known as a launch position. The stops 34 and 36, are preferably constituted of a resilient material, e.g. foam rubber, to prevent shattering of the reflector 22.

At this time, the drive end 44 slides past the cam tip 50, thereby suddenly and abruptly releasing the energy stored in the twisted torsion wire 24. Starting from the launch position, the now-released reflector 22 is thus free to harmonically oscillate about the axis of the torsion wire 24. Initially, the reflector 22 moves under the influence of the untwisting torsion wire 24 in the opposite circumferential direction past the rest position to another scan end position. Preferably, the reflector 22 travels all the way to the other stop 36. Thereupon, the reflector 22 oscillates back and forth about the longitudinal axis of the torsion wire 24 and, in fact, resonates at a frequency of oscillation determined, inter alia, by the inertia of the reflector 22 and the spring constant of the torsion wire 24. The reflector 22 continues its oscillations in a damped manner, with the amplitude or angular distance of travel of successive oscillations being progressively less than that of the previous oscillation. Eventually, after a time period on the order of one second, and after a plurality of such damped oscillations have occurred, the reflector 22 is returned by the torsion wire 24 to the rest position at which the reflector 22 has come to a halt.

Upon release of the trigger 13, the automatic return spring 38 urges the trigger to return to the off state. When the cam 48 returns to its initial position, the notch 42a of the rotary cam 42 engages the projection 60 of the trigger 13 and the wire 40 is re-set to its initial position in which it, once again, bears against the cam 48.

As described in connection with the embodiment of FIG. 2A, the reflector 22 is repetitively oscillated without the expenditure of any electrical power and with minimal force supplied to trigger 13. No electrical motors or electrically-driven elements are used to drive the oscillators. Rather, only mechanical power is used. The mechanical drive energy is derived primarily from the stored energy in the coil spring 65. This greatly reduces the amount of electrical energy consumed by the scanner while significantly reducing the amount of triggering force required by the operator. In the case where an on-board battery pack is used to electrically power the head, the working lifetime of such batteries is greatly increased due to the elimination of electrical energy requirements to drive the scanner component which heretofore was the major drain of electrical energy. Also, in using the bar code scanner according to the invention, the operator need only supply a small amount of mechanical energy to the scanner when operating the trigger, because a previously wound coil spring is used to supply the large majority of necessary power. Therefore, the risk of developing carpal tunnel syndrome from continuous actuations is reduced.

The oscillations need only last a second or so, since the number of oscillations, rather than time, determines the probability of successfully decoding the optical indicia. The resonating reflector has a controlled and generally uniform angular speed for increased system reliability.

Figure 2B:
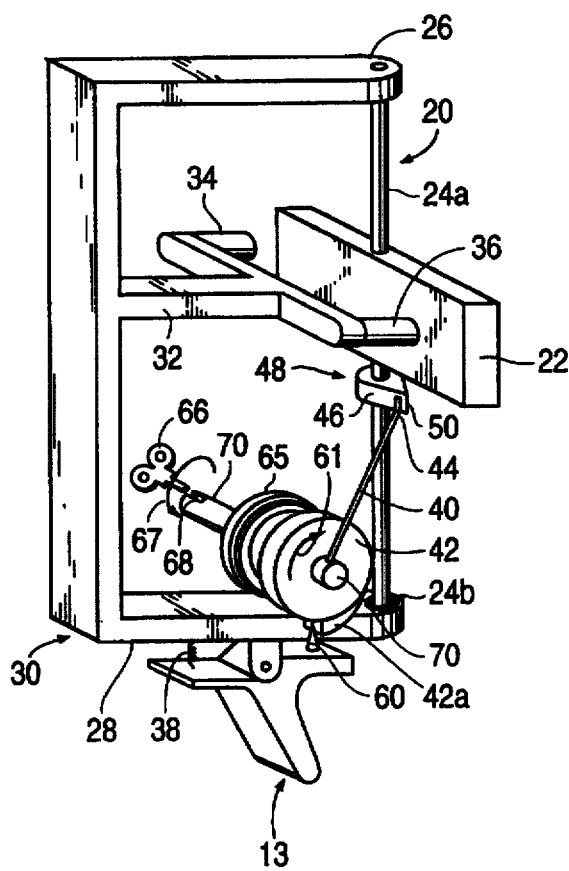
FIG. 2B is an illustration showing the rigid shaft and coil spring assembly in place of the torsion wire.

Alternatively to the torsion wire 24, a combination of a rigid shaft 24a and a second coil spring 24b can be used in the first embodiment (see FIG. 2B). In this case, the frequency of the oscillation will be determined by the rotational inertia of the light reflector and shaft assembly and the spring constant of the second coil spring 24b.

Figure 3:
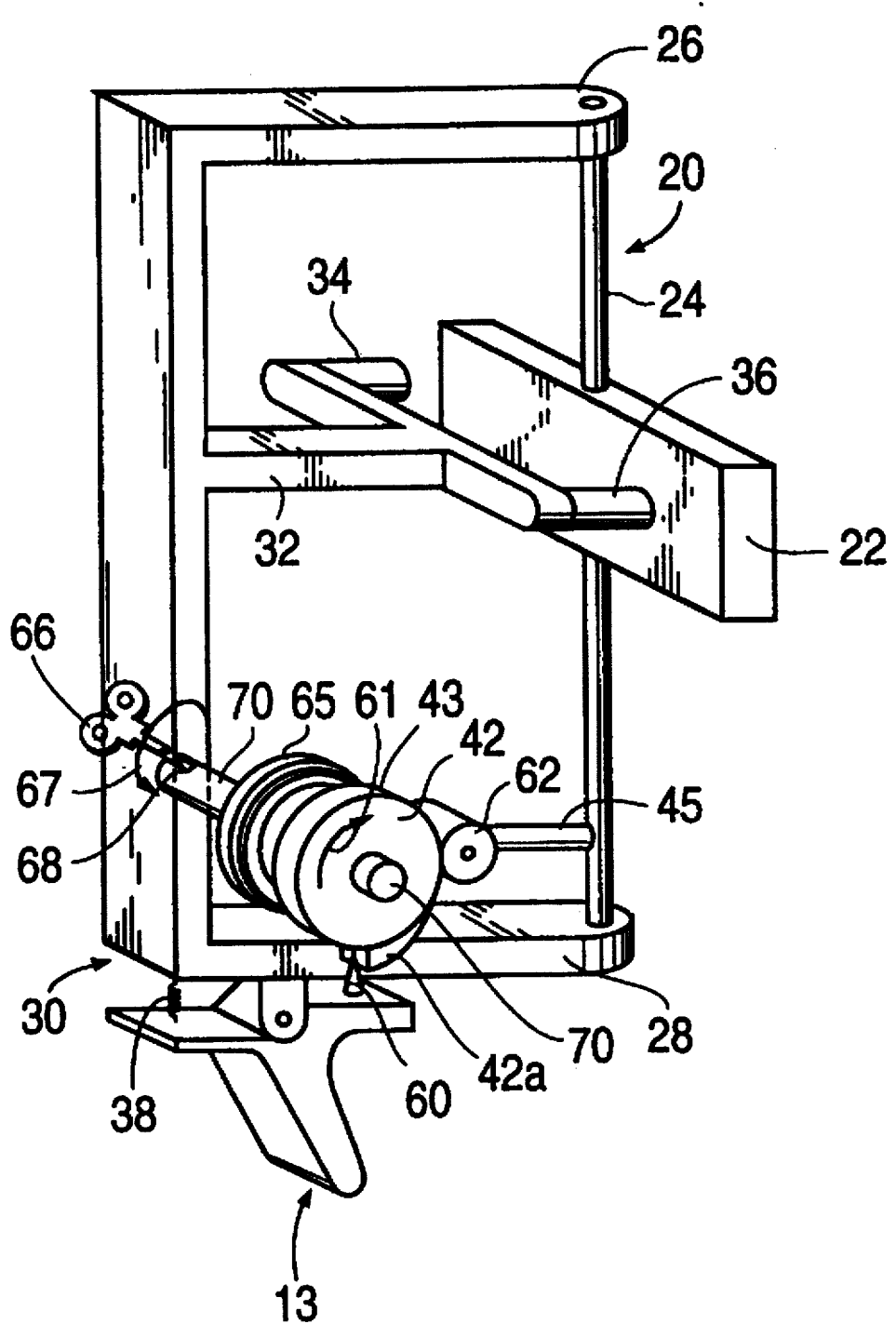
FIG. 3 is a view analogous to FIG. 2A, but of another embodiment of this invention.

In the embodiment of FIG. 3, the wind-up mechanism and the trigger assembly are identical to that of FIG. 2A. The difference is in the means for imparting oscillations to the light reflector 22. In FIG. 3, the element 24 is not a torsion wire or a shaft mounted on a coil spring. Instead, the element 24 is a rigid shaft pivotally mounted in the E-shaped frame. Also, integral with the rotary cam 42 is a gear 43. The gear 43 coacts with a reduction gear 62. The reduction gear 62 has on its surface, grooves, in addition to gear teeth. An arm 45, rigidly attached to shaft 24 is slidably engaged in the grooves of reduction gear 62. The grooves of the reduction gear 62 are formed such that a rotation of the reduction gear 62 causes reciprocal oscillations in the shaft 24 through the arm 45. The gear ratio between the rotary cam 42 and the reduction gear 62 and the grooves of the reduction gear 62 determine how many times the shaft 24 is oscillated per revolution of the rotary cam 42.

As with the embodiment of FIG. 2A, the reflector 22 is repetitively oscillated without the expenditure of any electrical power and with minimal force supplied to trigger 13. As a result, the expenditure of electrical energy and the risk of developing carpal tunnel syndrome from repeated actuations over time are minimized. A further advantage of the bar code scanner of the second embodiment is that the reciprocal oscillations of the shaft are for the most part, uniform.

Alternatively, the bar code scanner according to the invention can be implemented with the laser block or an aperture as the oscillating element.

While particular embodiments according to the invention have been illustrated and described above, it will be clear that the invention can take a variety of forms and embodiments within the scope of the appended claims.

What is claimed Is:

1. A bar code scanner comprising:
   (a) a movable component mounted in a light path for guiding light therein; and
   (b) an actuator initiating oscillations in the movable component to guide the light in the light path, at least one of the oscillations guiding the light across all parts of a bar code, wherein said actuator includes
     a coil spring;
     an output shaft connected with the coil spring for rotation thereby when the coil spring is released, the output shaft operably connected to the movable component to impart oscillation energy to the movable component;
     a winding mechanism for winding up the coil spring; and
     a trigger for releasing the coil spring for a desired number of rotations of the output shaft.

2. A bar code scanner as recited in claim 1 further comprising:
   (a) a spring for exerting a biasing force to the movable component to constantly bias the movable component to a rest position;
   (b) a lever responsive to the rotation of the output shaft for rotating the movable component away from the rest position against the biasing force to a launch position and storing energy in the spring, said lever abruptly releasing the stored energy after the movable component has rotated into the launch position to enable the spring to oscillate the movable component.

3. A bar code scanner as recited in claim 2, wherein the spring comprises an elongated spring extending along an axis and having opposite ends stationarily secured to a support, and wherein the movable component is mounted on the elongated spring between the ends thereof.

4. A bar code scanner as recited in claim 3, wherein the elongated spring comprises a torsion wire twistable about the axis.

5. A bar code scanner as recited in claim 2, wherein the lever includes an elongated shaft extending along an axis and having opposite ends mounted rotatably to a support and a coil spring secured to and attached to one of said ends of the elongated shaft, and wherein the movable component is mounted on the elongated shaft between the ends thereof.

6. A bar code scanner as recited in claim 2, wherein the launch position is angularly spaced from the rest position.

7. A bar code scanner as recited in claim 2, wherein the lever is rigidly connected to the output shaft for co-rotation therewith.

8. A bar code scanner as recited in claim 3, further comprising a cam fixedly mounted on the elongated spring and in force-transmitting engagement with the lever during rotation of the movable component toward said launch position.

9. A bar code scanner as recited in claim 8, wherein the cam is tapered radially outwardly of the axis and terminates in a tip, and wherein the lever slides past the tip and out of engagement with the cam after the movable component is situated at said launch position.

10. A bar code scanner as recited in claim 8, wherein the rotation of the output shaft is initiated by the trigger actuatable by a user from an off-state to an on-state, the trigger comprising a second spring for constantly urging the trigger to the off-state.

11. A bar code scanner as recited in 10, wherein the lever is fixedly attached to the output shaft to be rotatable therewith and the output shaft includes a rotary cam formed thereon, the rotary cam being in engagement with the trigger during the off-state and in rotation with respect to the trigger during the on-state.

12. A bar code scanner as recited in claim 1, and further comprising limit means for abutting the movable component at said launch position and for preventing movement of the movable component past said launch position.

13. A bar code scanner as recited in claim 1, wherein the movable component is a light reflector.

14. A bar code scanner as recited in claim 1, wherein the winding mechanism comprises a wind key engageable with the output shaft at a recess portion formed therein.

15. A bar code scanner as recited in claim 1 further comprising means on the movable component responsive to the rotation of the output shaft to oscillate the movable component.

16. A bar code scanner as recited in claim 15, wherein the rotation of the output shaft is initiated by the trigger actuatable by a user from an off-state to an on-state, the trigger comprising an automatic return means for constantly urging the trigger to the off-state, and wherein the output shaft includes a rotary cam formed thereon, the rotary cam being in engagement with the trigger during the off-state and in rotation with respect to the trigger during the on-state.

17. A bar code scanner as recited in claim 16, further comprising a support and a shaft mounted rotatably on the support and fixedly with the movable component.

18. A bar code scanner as recited in claim 17, further comprising a reduction gear having grooves formed thereon, a groove follower slidably disposed in the grooves and rigidly secured to the shaft, wherein the rotary cam also has a gear formed therewith and the reduction gear meshes with the rotary cam such that a rotation of the output shaft imparts a reciprocal oscillation to the movable component.

19. An optical scanning device including a scanning component in a light path of the optical scanning device, the scanning component causing a beam to be swept across an optical indicia to be read, the device comprising:

(a) a mechanical energy storing element;

(b) a winding mechanism for winding up the storing element to store mechanical energy therein;

(c) a trigger for releasing a portion of the mechanical energy stored in the storing element to initiate a scanning operation; and (d) means for imparting the portion of the mechanical energy stored in the storing element to the scanning component in response to an an actuation of the trigger to initiate oscillations of the scanning component, thereby causing the beam to be swept across the optical indicia.

20. A method of reading an optical indicia using an optical scanning device which includes a spring and a scanning component in a light path of the optical scanning device, the scanning component causing a beam to be swept across the optical indicia, said method comprising the steps of:

(a) winding up the spring to store mechanical energy in the spring before the reading;

(b) actuating a trigger of the optical scanning device to release a portion of the stored mechanical energy to initiates the reading: and (c) imparting the portion of the stored mechanical energy to the scanning component during the reading to oscillate the scanning component, thereby causing the beam to be swept across the optical indicia.

21. A method of reading an optical indicia as recited in claim 20, wherein the mechanical energy is stored in a coil spring.

* * * * *